United States Patent
Benhase et al.

(10) Patent No.: US 9,274,975 B2
(45) Date of Patent: *Mar. 1, 2016

(54) MANAGEMENT OF PARTIAL DATA SEGMENTS IN DUAL CACHE SYSTEMS

(71) Applicant: INTERNATIONAL BUSINESS MACHINES CORPORATION, Armonk, NY (US)

(72) Inventors: Michael T. Benhase, Tucson, AZ (US); Stephen L. Blinick, Tucson, AZ (US); Evangelos S. Eleftheriou, Rueschlikon (CH); Lokesh M. Gupta, Tucson, AZ (US); Robert Haas, Adliswil (CH); Xiao-Yu Hu, Horgen (CH); Matthew J. Kalos, Tucson, AZ (US); Ioannis Koltsidas, Zurich (CH); Roman A. Pletka, Uster (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,560

(22) Filed: Jun. 22, 2015

(65) Prior Publication Data

US 2015/0286580 A1 Oct. 8, 2015

Related U.S. Application Data

(63) Continuation of application No. 14/217,610, filed on Mar. 18, 2014, now Pat. No. 9,086,979, which is a continuation of application No. 13/786,633, filed on Mar. 6, 2013, now Pat. No. 8,719,494, which is a continuation of application No. 13/286,454, filed on Nov. 1, 2011, now Pat. No. 8,688,913.

(51) Int. Cl.
- G06F 12/00 (2006.01)
- G06F 12/12 (2006.01)
- G06F 12/08 (2006.01)

(52) U.S. Cl.
CPC .......... *G06F 12/128* (2013.01); *G06F 12/0811* (2013.01); *G06F 12/0868* (2013.01);
(Continued)

(58) Field of Classification Search
CPC G06F 12/0866; G06F 12/123; G06F 12/0862
See application file for complete search history.

(56) References Cited

U.S. PATENT DOCUMENTS 5,710,907 A * 1/1998 Hagersten et al. ............ 711/148
6,341,331 B1 1/2002 McNutt
(Continued)

OTHER PUBLICATIONS

Gill, "On Multi-level Exclusive Caching: Offline Optimality and Why promotions are better than donations", pp. 49-65, USENIX Association, Fast '08: 6th USENIX Conference on File and Storage Technologies.

*Primary Examiner* — Hal Schnee
*Assistant Examiner* — Arvind Talukdar
(74) *Attorney, Agent, or Firm* — Griffiths & Seaton PLLC

(57) ABSTRACT

For movement of partial data segments within a computing storage environment having lower and higher levels of cache by a processor, a whole data segment containing one of the partial data segments is promoted to both the lower and higher levels of cache, including considering an Input/Output Performance (IOP) metric, a bandwidth metric, and a garbage collection metric, and a whole data segment is promoted containing the one of the partial data segments to both the lower and higher levels of cache.

7 Claims, 6 Drawing Sheets

(52) U.S. Cl.
CPC ........ *G06F12/0891* (2013.01); *G06F 12/0897*
(2013.01); *G06F 12/126* (2013.01); *G06F*
*2212/1021* (2013.01); *G06F 2212/1041*
(2013.01); *G06F 2212/222* (2013.01); *G06F*
*2212/283* (2013.01); *G06F 2212/69* (2013.01)

(56) References Cited

U.S. PATENT DOCUMENTS

| | | | |
|---|---|---|---|
| 6,557,080 B1 | 4/2003 | Burger et al. |
| 6,823,427 B1 | 11/2004 | Sander et al. |
| 6,857,045 B2 | 2/2005 | Galbraith et al. |
| 6,965,969 B2 | 11/2005 | Burger et al. |
| 7,856,531 B2 | 12/2010 | Bruening et al. |
| 2004/0083341 A1 | 4/2004 | Robinson et al. |
| 2004/0103251 A1 | 5/2004 | Alsup |
| 2005/0228954 A1 | 10/2005 | Factor et al. |
| 2006/0069843 A1 | 3/2006 | Emma et al. |
| 2011/0072218 A1 | 3/2011 | Manne et al. |
| 2011/0087837 A1 | 4/2011 | Blinick et al. |
| 2012/0331227 A1 | 12/2012 | Saripalli |

\* cited by examiner

MANAGEMENT OF PARTIAL DATA SEGMENTS IN DUAL CACHE SYSTEMS

CROSS REFERENCE TO RELATED APPLICATIONS

This application is a Continuation of U.S. patent application Ser. No. 14/217,610, filed on Mar. 18, 2014, which is a Continuation of U.S. patent application Ser. No. 13/786,633, filed on Mar. 6, 2013, now U.S. Pat. No. 8,719,494, which is a Continuation of U.S. patent application Ser. No. 13/286,454, filed on Nov. 1, 2011, now U.S. Pat. No. 8,688,913, all of which are incorporated herein by reference.

BACKGROUND OF THE INVENTION

1. Field of the Invention

The present invention relates generally to computers, and more particularly, to mechanisms for managing partial data segments in a computing storage environment having a dual cache system.

2. Description of the Related Art

In today's society, computer systems are commonplace. Computer systems may be In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

SUMMARY OF THE DESCRIBED EMBODIMENTS

Caches may be provided as multi-level caches. For example, a caching system may include both a "primary" and "secondary" cache. When reading data, a computing system or device may first look for data in the primary cache and, if the data is absent, look for the data in the secondary cache. If the data is not in either cache, the computing system or device may retrieve the data from disk drives or other storage devices. When writing data, a computing system or device may write data to the primary cache. This data may eventually be destaged to the secondary cache or a storage device to make room in the primary cache.

In data processing systems having multi-level caches, writing so-called "partial tracks," or data segments that are not completely full, to a secondary cache may present challenges. For example, storage space on the secondary cache may be wasted. In a secondary cache implemented as flash memory, or Flash Cache, the memory typically is expensive to implement and wasting memory space may consume scarce resources. In addition, returning to the disk drives or other primary storage to gather the additional data to fill the "holes" in the partial tracks may incur additional input/output (I/O) activity, also consuming resources and potentially slowing performance.

In view of the foregoing, a need exists for efficient management of partial data segments in primary/secondary cache systems. Accordingly, and in view of the foregoing, various exemplary embodiments for movement of partial data segments within a computing storage environment having lower and higher levels of cache by a processor are provided. In one such embodiment, by way of example only, a whole data segment containing one of the partial data segments is promoted to both the lower and higher levels of cache, including considering an Input/Output Performance (IOP) metric, a bandwidth metric, and a garbage collection metric, and a whole data segment is promoted containing the one of the partial data segments to both the lower and higher levels of cache.

In addition to the foregoing exemplary embodiment, various other embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

For the purposes of this disclosure, the phrase "secondary cache" is used to refer to any cache (including, for example, L2 or L3 cache) that resides between a primary cache and a storage device, such as a disk drive, tape drive, or the like.

Figure 1:
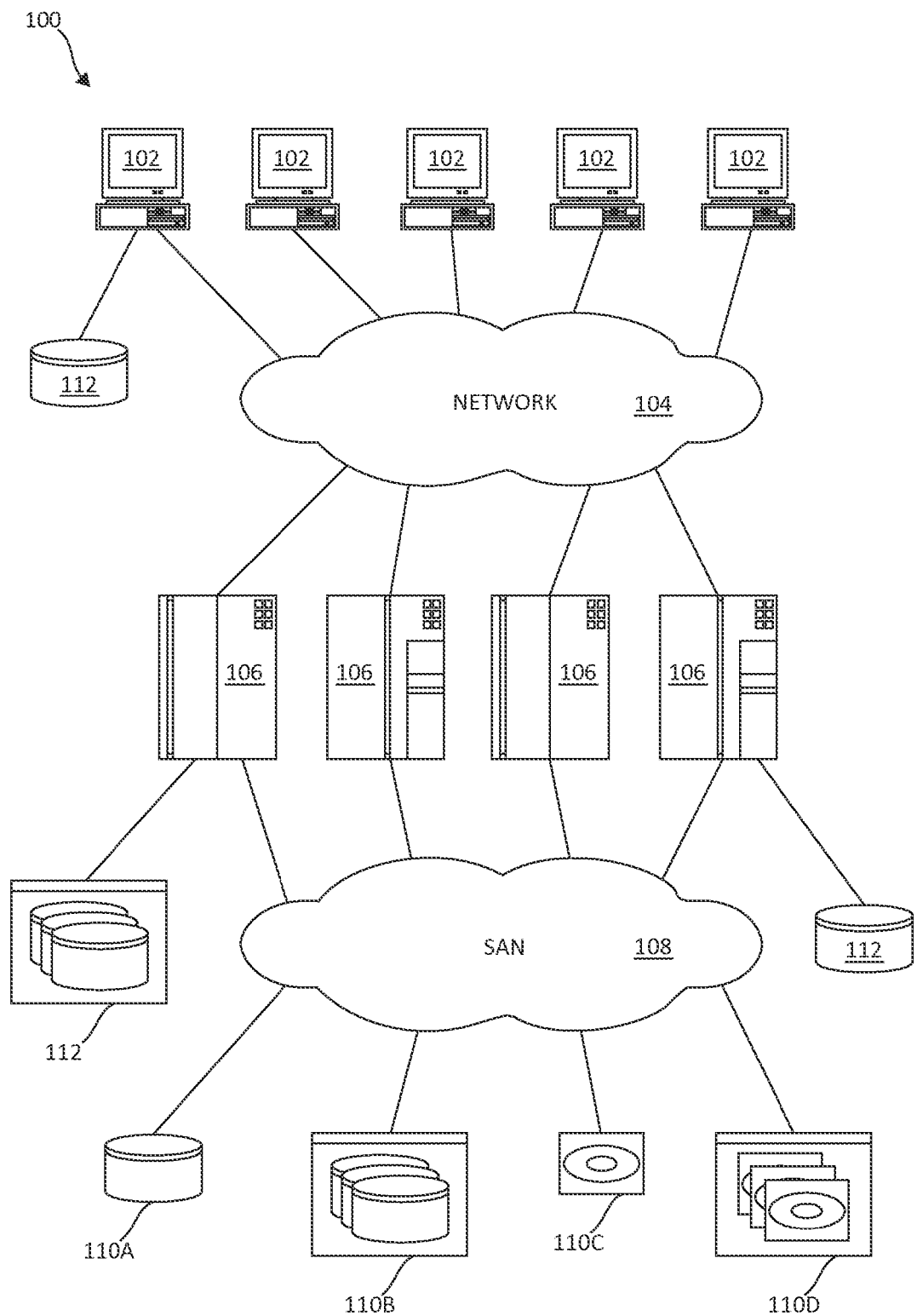
FIG. 1 is a high-level block diagram showing one example of a network and computing environment where an apparatus and method in accordance with the invention may be implemented.

Referring to FIG. 1, one embodiment of computer-network architecture 100 is illustrated. The architecture 100 is presented to show various scenarios for implementing the caching system illustrated herein. The architecture 100 is presented only by way of example and is not intended to be limiting. Indeed, the caching system disclosed herein may be applicable to a wide variety of different computers, servers, storage systems, and network architectures, in addition to the network architecture 100 shown.

As shown, the computer-network architecture 100 may include one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106. In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., hard disk drives, solid-state drives, tape drives, etc). These computers 102, 106 and direct-attached storage devices 112 may communicate using protocols such as ATA, SATA, SCSI, SAS, Fibre Channel, or the like. Any or all of the computers 102, 106 may utilize the caching system described herein to access data from the storage devices 112.

The computer-network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as individual hard disk drives 110a or solid state drives 110a, arrays 110b of hard disk drives or solid-state drives, tape drives 110c, tape libraries 110d, CD-ROM libraries, or the like. Where the network 108 is a. SAN, the servers 106 and storage systems 110 may communicate using a networking standard such as Fibre Channel (FC). Any or all of the computers 102, 106 may utilize the caching system described herein to store data retrieved from the storage devices 110.

Figure 2:
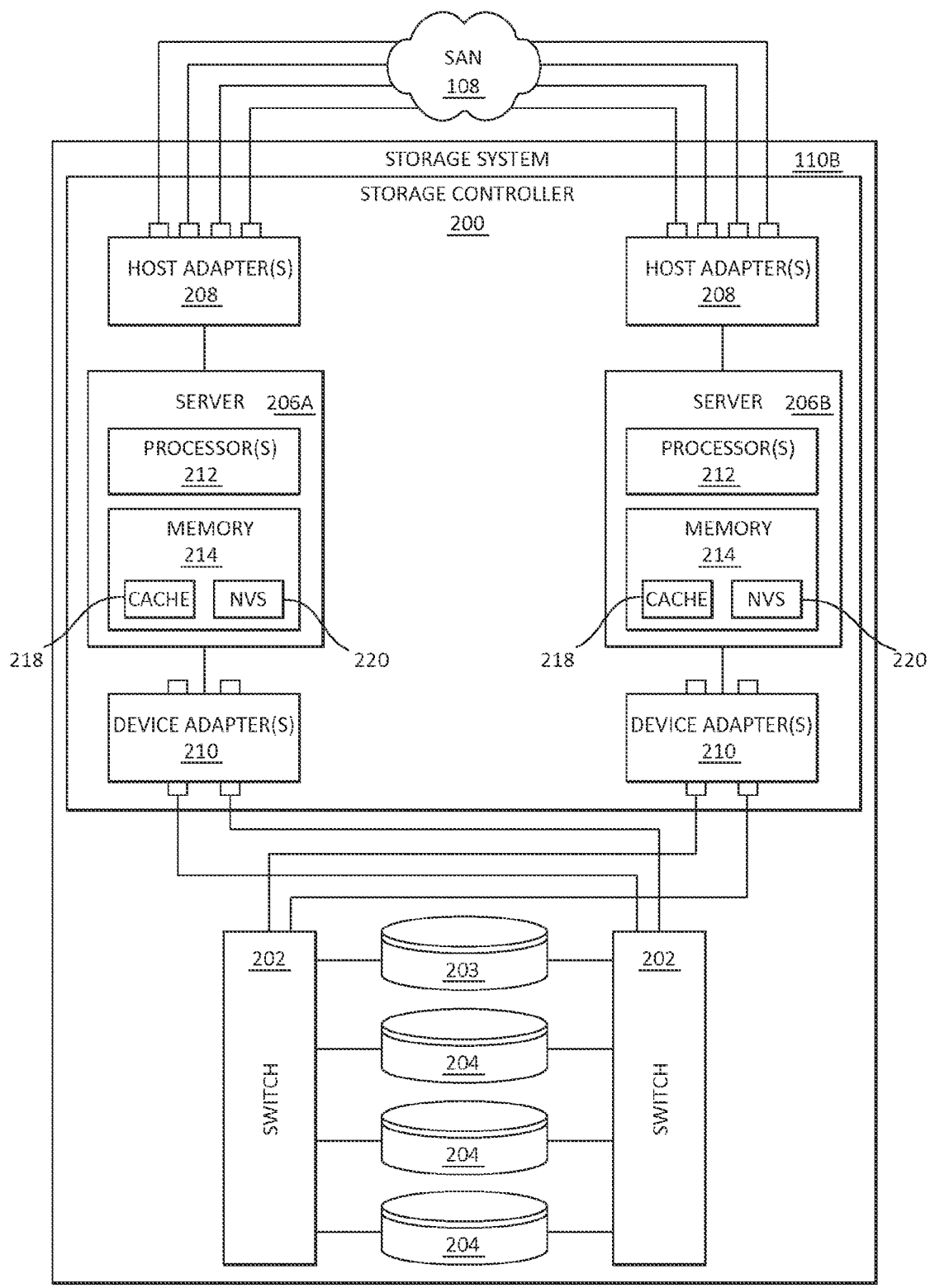
FIG. 2 is a high-level block diagram showing one example of a storage system where an apparatus and method in accordance with the invention may be implemented.

Referring to FIG. 2, one embodiment of a storage system 110b containing an array' of hard-disk drives 204 and/or solid-state drives 203 is illustrated. The internal components of the storage system 110b are shown since the caching system may, in certain embodiments, be implemented within such a storage system 110b, although the caching system may also be applicable to other storage systems 110. As shown, the storage system 110b includes a storage controller 200, one or more switches 202, and one or more storage devices 203, 204, such as hard disk drives 204 or solid-state drives 203 (such as flash-memory-based drives 203). The storage controller 200 may enable one or more hosts 106 (e.g., open system and/or mainframe servers 106) to access data in the one or more storage devices 203, 204.

In selected embodiments, the storage controller 200 includes one or more servers 206. The storage controller 200 may also include host adapters 208 and device adapters 210 to connect the storage controller 200 to host devices 106 and storage devices 203, 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 203, 204. This process may be referred to as a "failover."

One example of a storage system 110b having an architecture similar to that illustrated in FIG. 2 is the IBM® DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the caching system disclosed herein is not limited to the IBM® DS8000™ enterprise storage system 110b, but may be implemented in any comparable or analogous storage system 110, regardless of the manufacturer, product name, or components or component names associated with the system 110. Furthermore, any system that could benefit from one or more embodiments of the invention is deemed to fall within the scope of the invention. Thus, the IBM® DS8000™ is presented only by way of example and is not intended to be limiting.

In selected embodiments, each server 206 may include one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may, in certain embodiments, store software modules that run on the processor(s) 212 and are used to access data in the storage devices 203, 204. The servers 206 may host at least one instance of these software nodules. These software modules may manage all read and write requests to logical volumes in the storage devices 203, 204.

In selected embodiments, the memory 214 may include a cache 218. Whenever a host 106 (e.g., an open system or mainframe server 106) performs a read operation, the server 206 that performs the read may fetch data from the storages devices 203, 204 and save it in its cache 218 in the event it is required again. If the data is requested again by a host 106, the server 206 may fetch the data from the cache 218 instead of fetching it from the storage devices 203, 204, saving both time and resources. Similarly, when a host 106 performs a write, the server 106 that receives the write request may store the write in its cache 218, and destage the write to the storage devices 203, 204 at a later time. When a write is stored in cache 218, the write may also be stored in non-volatile storage (NVS) 220 of the opposite server 206 so that the write can be recovered by the opposite server 206 in the event the first server 206 fails.

Figure 3:
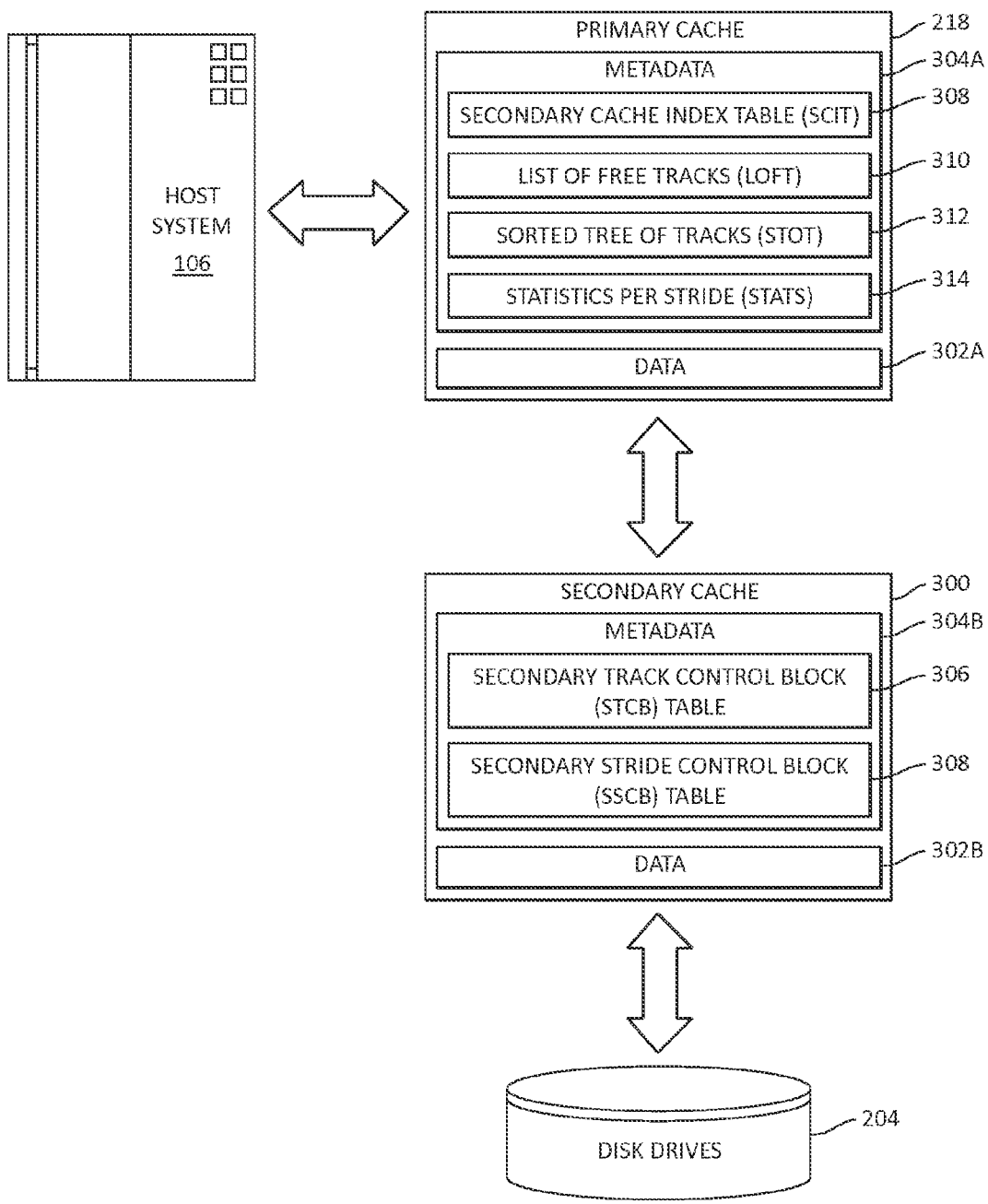
FIG. 3 is a high-level block diagram showing one embodiment of a multi-level cache in accordance with the invention.

Referring to FIG. 3, while continuing to refer generally to FIG. 2, as previously mentioned, a storage system 110b may include both hard disk drives 204 and solid-state drives (SSDs) 203, such as flash-memory-based drives 203. The I/O performance of SSDs 203 or other types of solid-state memory is typically far higher than the I/O performance of hard disk drives 204. Because of the higher I/O performance, the solid-state drives 203 may, in certain embodiments, be used to provide a large secondary cache 300 between the primary cache 218 and the hard disk drives 204. This large secondary cache 300 may significantly improve the I/O performance of the storage system 110 b, and may be referred to herein as "Flash Cache."

Using the secondary cache 300, if a read request is received by a server 106 the server 106 may initially look for data in the primary cache 218 and, if the data is not present, look for the data in the secondary cache 300 (residing in the solid-state drives 203). If the data is not available in either cache, the server 106 may retrieve the data from the disk drives 204. Similarly, when writing data, a server 106 may initially write the modified data to the primary cache 218. This modified data may eventually be destaged to the secondary cache 300 to make room in the primary cache 218. This data may then be destaged to the disk drives 204 to make space in the secondary cache 300, as needed.

In certain embodiments, the secondary cache 300 may be sized to provide about one to twenty percent, or in other embodiments about five percent of the total storage capacity of the storage system 110b. Thus, for a storage system 110 b that contains about ten terabytes (TB) of storage (from both hard disk drives 204 and solid state drives 203), about 0.5 TB of this storage space may be used as a secondary cache 300. Such a large amount of secondary cache 300 may allow data to be destaged from the secondary cache 300 far less frequently than conventional secondary caches. As an example, a very large secondary cache 300 could store writes for an entire day without having to destage the writes to the disk drives 204. The writes could then be destaged at night or during a period of relative inactivity. Cache management algorithms may be redesigned to efficiently utilize the additional space in the secondary cache 300 and take advantage of the performance improvements that are possible using a large secondary cache 300.

As shown in FIG. 3, each cache 218, 300 may store data 302a, 302h and metadata 304a, 304h. As will be shown in FIG. 4, the data 302a, 302h may be stored in the form of tracks. Each track in the secondary cache 300 may have a secondary track control block (STCB) associated therewith. The STCB may also be referred to herein as Cache Flash Control Block (CFCB). Along with other information, the STCB for each track may include a pointer to the next track in the chain, information indicating whether the track is free or in-use, as well as information indicating which sectors in the track have been modified. In certain embodiments, the STCBs for all the tracks may be stored in an STCB table 306 stored in the secondary cache 300 as shown, or elsewhere.

In addition, each track in the secondary cache 300 may have a secondary stride control block (SSCB) associated therewith. The SSCB, like the STCB may include diagnostic and/or statistical information, but instead relating to strides (groups of tracks) stored in the secondary cache 300. The SSCB may also be referred to herein as Cache Flash Element (CFE). In certain embodiments, the SSCBs for all the strides may be stored in an SSCB table 308 stored in the secondary cache 300 as shown, or elsewhere.

Similarly, the primary cache 218 may also store metadata 304a associated with the secondary cache 300. For example, the primary cache 218 may store a secondary cache index table (SOT) 308 that provides a directory for tracks in the secondary cache 300. In certain embodiments, the SCIT 308 is essentially a hash table with a constant hash function. To locate a specific track in the SCIT 308 the hash function may convert a track identifier (e.g., a track number) to a hash value. This hash value may then be looked up in the SCIT 308 to find the STCB for the track. Alternatively, the SOT 308 could be incorporated into a cache directory of the primary cache 218, thereby providing a single hash table that stores tracks for both the primary and secondary caches 218, 300. In selected embodiments, the SCIT 308 is kept exclusively in the primary cache 218. The SCIT 308 may be built or rebuilt (in the event of a failover, failback, or initial microcode load (IML)) by reading the STCB table 306 in the secondary cache 300.

In certain embodiments, the primary cache 218 may also store a list of free tracks (LOFT) 310 that indicates which tracks in the secondary cache 300 are free (i.e. unoccupied). This list 310 may be used to locate free space in the secondary cache 300 in order to destage data from the primary cache 218 to the secondary cache 300. In selected embodiments, inserting or removing tracks from the LOFT 310 may be performed in a log structured manner. For example, tracks may be inserted at the end of the LOFT 310 and deleted from the front of the LOFT 310. The LOFT 310 may be kept exclusively in the primary cache 218 and may be built or rebuilt by reading the STCB table 306 in the secondary cache 300.

The primary cache 218 may also store a sorted tree of tracks (STOT) 312 that sorts the tracks by "trackid" or some other indicator. The STOT 312 may be used to minimize seek time (on the disk drives 204) when destaging tracks from the secondary cache 300 to the disk drives 204. The STOT 312 may be kept exclusively in the primary cache 218 and may be built or rebuilt by reading the STCB table 306 in the secondary cache 300.

The primary cache 218 may also store statistics per stride (STATS) 314 for each stride having one or more tracks in the secondary cache 300. A "stride" refers to a set of logically sequential data that might be segmented across multiple disks combined with additional panty information as is for example used in a RAID-5 (redundant array of inexpensive disks) configuration. In general, the STATS 314 may be used to determine which tracks require the least number of disk operations ("disk ops") to destage from the secondary cache 300 to the disk drives 204. In general, the destage penalty for a track will be less where more tracks are present in a stride. When selecting tracks to destage, tracks requiring the least number of disk ops may be destaged first to minimize resource utilization. In selected embodiments, the STATS 314 may store information such as the number of tracks that are present in the secondary cache 300 for each stride, and the number of disk ops required to destage a track in a stride. In certain embodiments, the STATS 31.4 may store a. "recency" bit for each stride. The recency bit may be incremented each time an eviction process passes through a stride. The recency bit may be reset each time a track is added to a stride. The recency bit may be used to keep strides in the secondary cache 300 that are actively being written to. The STATS 314 may be kept exclusively in the primary cache 218 and may be built or rebuilt by reading the STCB table 306 in the secondary cache 300.

The metadata 304a, 304b described, above may be structured and stored in various different ways and is not limited to the illustrated structure or organization. The metadata 304a, 304h is provided by way of example to show one technique for storing and structuring the metadata 304a, 304b. For example, in certain embodiments, the data and metadata may be stored together in the secondary cache 300 in a circular log-structured, array. Other methods for structuring and storing metadata 304a, 304b may be used and are encompassed within the scope of the invention.

As previously mentioned, one advantage of a large secondary cache 300 is that data can be destaged from the secondary cache 300 far less frequently than conventional secondary caches. This may enable more data to accumulate in the secondary cache 300 before it is destaged to the disk drives 204. Accordingly, in selected embodiments, an apparatus and method in accordance with the invention may be configured to wait for full strides of data to accumulate and coalesce in the secondary cache 300 before the data is destaged to the disk drives 204. As explained above, this may minimize the number of disk ops required to destage data from the secondary cache 300 to the disk drives 204, thereby improving overall system performance.

Figure 4:
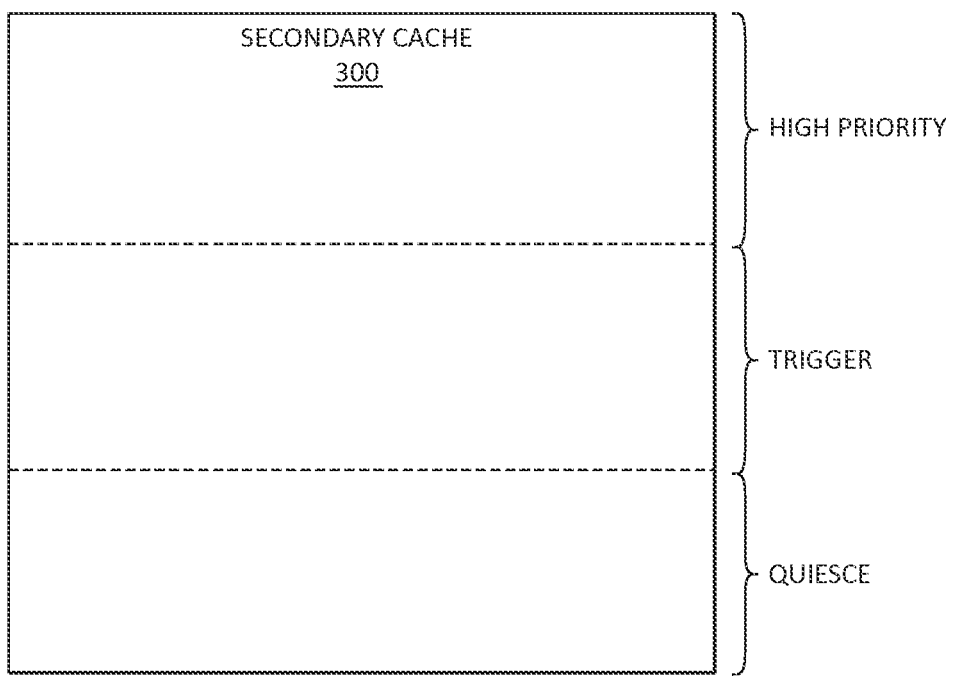
FIG. 4 is a high-level block diagram showing various levels or ranges that may be implemented within the secondary cache.

Referring to FIG. 4, in certain embodiments, evictions from the secondary cache 300 may be performed based on occupancy. For example, three ranges may be defined in the secondary cache 300: (1) quiesce; (2) trigger; and (3) high priority. When the occupancy of the secondary cache 300 is in the quiesce range (e.g., the secondary cache 300 is between zero and fifty percent full), no data may be evicted from the cache 300. Similarly, when the cache occupancy is in the trigger range (e.g., the secondary cache 300 is between fifty and seventy percent full), cache evictions may be performed in a normal mode until the cache occupancy is within the quiesce range. Similarly, when the cache occupancy is in a high priority range (e.g., the secondary cache 300 is greater than seventy percent full), cache evictions may be performed in a high priority mode until the cache occupancy is back in the trigger range. The numeric ranges provided above are presented only by way of example and are not intended to be limiting. Regardless of the eviction mode, the eviction process may destage tracks requiring the least number of disk ops to destage.

As previously mentioned, movement of partial data segments, (e.g., tracks) to the secondary cache may incur wasted storage space on the secondary cache itself, and/or may result in additional I/O operations as additional work may be necessary to fill any holes with data from the backing storage. To assist in management of data segments between a dual cache system (i.e. primary and secondary cache system as previously described), the illustrated embodiments provide mechanisms for data movement between backing storage, primary and secondary caches as will be further described.

The mechanisms of the illustrated embodiments aim to eliminate partial data segments in the primary (e.g., DRAM) cache, so that promotions of data segments to the secondary (e.g., Flash) cache are consistently whole data segments. To accomplish this objective, in one embodiment, these mechanisms stage full tracks in the primary cache, even when a partial stage is requested. Pages, or portions of the tracks that were not part of a client/host request may then be pinned, or held, in cache until the promotion of the data segment is complete. Once the promotion to the secondary cache is completed, those portions not requested by the client/host may then be demoted out of the primary cache.

Figure 5:
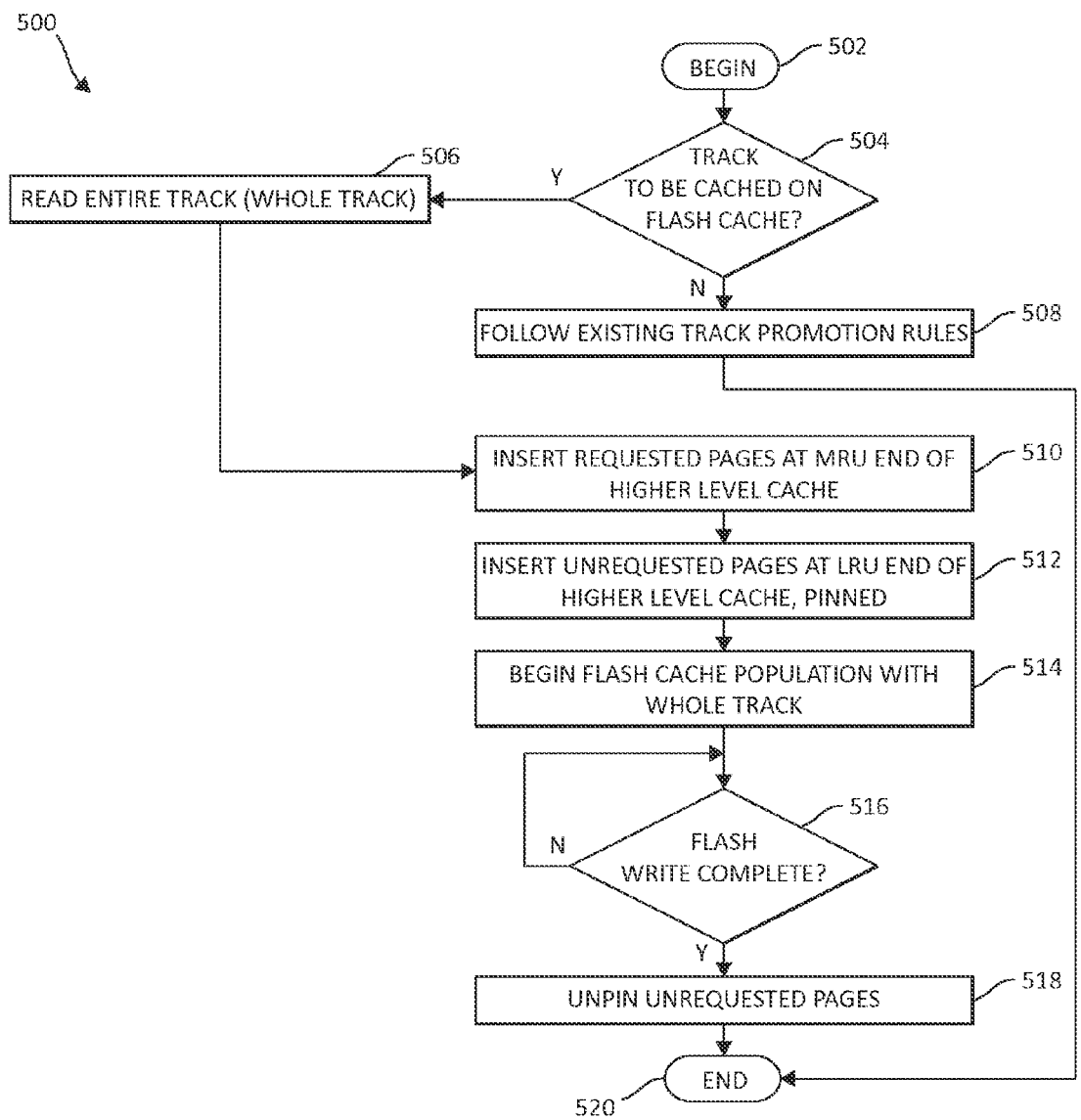
FIG. 5 is a flowchart illustrating, an exemplary method for management of data segments, including efficient promotion of partial data segments in accordance with one embodiment.

Turning now to FIG. 5, method 500 illustrates an exemplary method for data management in a computing storage environment having primary, secondary, and backing storage systems as previously described in accordance with various mechanisms of the illustrated embodiments. Method 500 begins (step 502) with a determination of whether a particular data segment (track) is to be cached on the secondary cache (Flash Cache) (step 504). If no, existing track promotion rules are executed (step 508), and the method 500 ends (step 520). Otherwise the entire track (including requested and unrequested portions) is read (step 506).

Method 500 then moves to step 510, where the requested pages are placed at a Most Recently Used (MRU) portion of the primary/higher level cache, and then to step 512, where the unrequested pages are placed at a Least Recently Used (LRU) portion of the primary/higher level cache and pinned. As a following or concurrent step, the secondary cache is populated with the whole track (step 514). Once the write to secondary cache is complete (step 516), then the unrequested pages are unpinned from the LRU portion of the primary cache (step 518), and the method 500 ends (again, step 520).

Figure 6A:
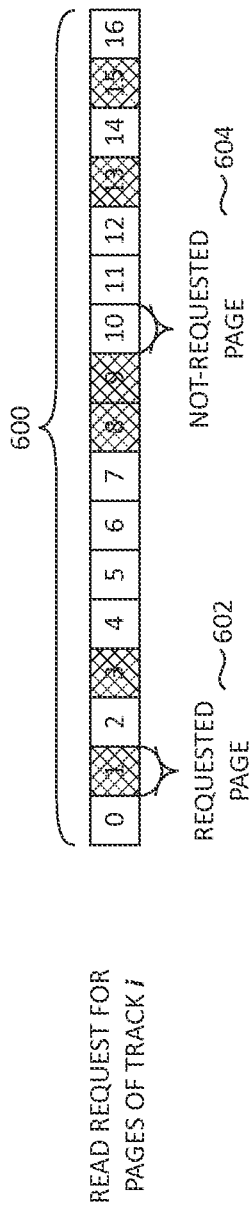
FIG. 6A is a block diagram illustrating, an exemplary read request, and its request and non-requested data pages of a track.
Figure 6B:
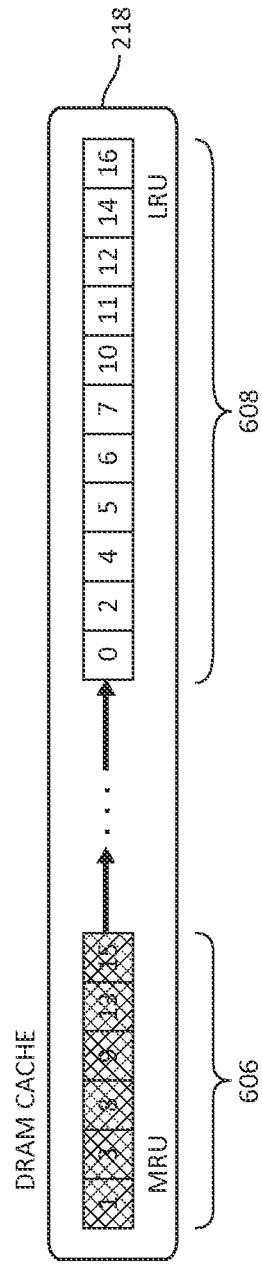
FIG. 6B is a block diagram of an exemplary read request and its subsequent placement in the primary cache.

FIGS. 6A and 6B, following, illustrate block diagrams of a read request and its subsequent placement in the primary (as shown in this embodiment, DRAM) cache. As shown in FIG. 6A, the read request for various pages of a track i (data segment 600) contains 0-16 pages, including requested pages 602 and unrequested pages 604. As shown, following in FIG. 6B, the data segment is split, where the requested pages are placed in the MRU end of the primary cache 218 (shown here as requested pages 606), and the unrequested pages are placed at the LRU end of the primary cache 218 (shown here as unrequested pages 608). The unrequested pages 608 are pinned in the cache 218 until the promotion of the same data segment 600 to the secondary cache has completed. The unrequested pages 608 are then unpinned.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for movement of partial data segments within a computing storage environment having lower and higher levels of cache by a processor, comprising:
    determining if one of the partial data segments should be cached on the lower level of cache, including considering an Input/Output Performance (IOP) metric, a bandwidth metric, and a garbage collection metric; and
    promoting a whole data segment containing the one of the partial data segments to both the lower and higher levels of cache.

2. The method of claim 1, wherein requested data of the whole data segment is split and positioned at a Most Recently Used (MRU) portion of a demotion queue of the higher level of cache.

3. The method of claim 2, further wherein:
    unrequested data of the whole data segment is split and positioned at a Least Recently Used (LRU) portion of the demotion queue of the higher level of cache, and
    the unrequested data is pinned in place until a write of the whole data segment to the lower level of cache completes.

4. The method of claim 1, wherein promoting the whole data segment occurs pursuant to a read request for the one of the partial data segments.

5. The method of claim 1, wherein determining if the one of the partial data segments should be cached on the lower level of cache includes considering if the one of the partial data segments is sequential with another one of the partial data segments.

6. The method of claim 1, wherein if the one of the partial data segments is determined not to be cached on the lower level of cache, an existing promotion rule is executed in lieu of promoting the whole data segment.

7. The method of claim 1, wherein if the one of the partial data segments is determined to be cached on the lower level of cache, the lower level of cache is populated with the whole data segment, and the unrequested data of the whole data segment at the LRU end of the higher level of cache is unpinned when the population of the lower level of cache with the whole data segment has completed.

* * * * *